United States Patent [19]

Rhodes, Jr. et al.

[11] Patent Number: 5,326,524
[45] Date of Patent: Jul. 5, 1994

[54] METHOD OF MAKING PLASTIC RODS

[75] Inventors: Vergil H. Rhodes, Jr.; John D. Winkel; Benedict R. Bonazza, all of Bartlesville, Okla.

[73] Assignee: Phillips Petroleum Company, Bartlesville, Okla.

[21] Appl. No.: 489,152

[22] Filed: Mar. 23, 1990

[51] Int. Cl.⁵ ................................ B29C 53/00
[52] U.S. Cl. .................... 264/294; 264/296; 264/339; 425/392
[58] Field of Search ........... 264/336, 339, 257, 258, 264/285, 294, 295, 296; 156/180, 181; 425/392

[56] References Cited

U.S. PATENT DOCUMENTS

| | | | |
|---|---|---|---|
| 4,158,586 | 6/1979 | Usui | 264/339 |
| 4,164,530 | 8/1979 | Renjiliar | 264/339 |
| 4,194,873 | 3/1980 | Killmeyer | 425/93 |
| 4,260,143 | 4/1981 | Kliger | 267/148 |
| 4,289,465 | 9/1981 | Killmeyer et al. | 425/111 |
| 4,296,060 | 10/1981 | Killmeyer et al. | 264/137 |
| 4,380,483 | 4/1983 | Kliger | 156/169 |
| 4,433,121 | 2/1984 | Schaper | 264/174 |
| 4,464,216 | 8/1984 | Gardiner | 156/162 |
| 4,564,048 | 1/1986 | Taylor | 138/31 |
| 4,680,923 | 7/1987 | Kaempen | 57/251 |
| 4,740,422 | 4/1988 | Kaempen | 428/375 |
| 4,746,386 | 5/1988 | Sato | 264/339 |
| 4,757,658 | 7/1988 | Kaempen | 52/309 |
| 4,758,024 | 7/1988 | Kaempen | 285/55 |
| 4,762,583 | 8/1988 | Kaempen | 156/173 |
| 4,775,563 | 10/1988 | Kaempen | 428/36 |
| 4,777,005 | 10/1988 | Miller | 264/339 |
| 4,786,536 | 11/1988 | Kaempen | 428/36.3 |

Primary Examiner—Jay H. Woo
Assistant Examiner—James P. Mackey
Attorney, Agent, or Firm—Morrison Bennett

[57] ABSTRACT

In bending rods reinforced with continuous fibers, buckling or stretching of reinforcing fibers is reduced by conforming the continuous fibers to a helical configuration within the rods before or when the rods are bent. The helical configuration causes fibers near the surface of the rod to travel substantially the same distance when the rod is bent whether the fibers are on the inside radius or the outside radius of the bend.

6 Claims, 4 Drawing Sheets

METHOD OF MAKING PLASTIC RODS

BACKGROUND OF THE INVENTION

This invention relates to a fiber reinforced plastic rod, an apparatus, and methods for making and postforming the rod.

Thermoplastic and thermoset rods have been reinforced with continuous longitudinally aligned unidirectional fibers of glass, carbon, aramid, steel or hybrid fibers for uses in torsion and coil springs and other manufactured products requiring bent shapes.

When continuous fiber reinforced rods are used for applications which require bending of the rods, longitudinally aligned fibers in the rods buckle in the inside radius of the bend, the arc length of which is comparatively shorter than the longer arc length for the same length fibers on the outside radius of the bend. This buckling of the reinforcing fibers causes distortions in the intended shape, delamination, significant uncontrolled toss of mechanical strength, and difficulty in postforming the coil, torsion spring or other part.

Reinforced plastic rods with longitudinally aligned fibers are not particularly suited to resisting torque and resist shaping during manufacture into coil springs, torsion springs, or other shapes requiring bends. This problem has been addressed by forming coil springs by winding a braided fiber reinforced composite around a mandrel while the polymer matrix is fluid and allowing the resulting article to cure or solidify.

OBJECTS OF THE INVENTION

It is an object of this invention to provide a method for making continuous fiber reinforced rods which will form a radius with reduced distortion when bent rather than buckling in the area of the inside radius of the bend.

It is a further object of this invention to provide a method for bending fiber reinforced plastic rods so as to minimize buckling in the inside radius of the bend.

It is another object of this invention to provide a fiber reinforced plastic rod which can be post formed into shapes having bends with enhanced manufacturability and improved performance.

Another object of this invention is to provide an apparatus with which to cause a helical configuration of the continuous reinforcing fibers in a plastic rod.

Still another object of this invention is to provide an apparatus with which to bend a fiber reinforced plastic rod.

SUMMARY OF THE INVENTION

In accordance with one embodiment of this invention a composite rod having longitudinal reinforcing fibers in a plastic matrix is twisted to give a helical orientation to the fibers.

In accordance with another embodiment of this invention a composite rod having helical reinforcement is postformed to give a bent shape.

In accordance with yet another embodiment of this invention a composite rod having longitudinal reinforcing fibers in a plastic matrix is postformed by heating some portion of the rod, twisting the rod to give a helical orientation to the fibers, and then is bent.

In accordance with still another embodiment of this invention, continuous reinforcing fibers in a plastic rod are in a helical arrangement wherein the number of helices along a given length of the rod is correlated with the radius of the bend to be formed in the rod.

Another embodiment of this invention is an apparatus with which a fiber reinforced plastic rod can be heated and twisted to cause a helical alignment of the reinforcing fibers. A further use of this apparatus is postforming the fiber reinforced plastic rods.

BRIEF DESCRIPTION OF THE DRAWINGS

In the drawings, forming a part hereof, wherein like reference characters denote like parts.

DETAILED DESCRIPTION OF THE INVENTION

Reinforcing fibers contemplated as useful are preferably selected from the group consisting of ceramic fibers, glass fibers, carbon fibers, aramid fibers, metal fibers or hybrid fibers of one or more of these materials.

A variety of thermoplastic materials can be utilized as the matrix material. Examples of such thermoplastic materials are poly(arylene sulfides), nylons, polyetheretherketones, polyolefins, poly(arylene sulfide ketones), poly(arylene sulfide sulfones), polycarbonates, and the like. More specifically, poly(phenylene sulfides) can be used.

Representative thermosetting resinous materials which may be utilized include epoxy resins, phenolic resins, polyester resins, vinylester resins, polyimide resins, polybenzimidazoles, and polyurethanes.

This description will be discussed using the term "plastic rod"; however, it is to be understood that elongated structures such as those having other than round cross-sections, or those having grooved or ridged surfaces are also contemplated as within the scope of this invention. In one embodiment reinforced plastic rod with continuous longitudinally aligned unidirectional reinforcing fibers is tensioned and heated over a portion of the rod that includes the area in which it is desired to make a postformed bend. After locally tensioning and heating some portion of the reinforced plastic rod, tension is maintained on the heated area while one end of the rod is immobilized and the other end is rotated a measured number of degrees or radians to cause a twist in the rod and thus a helical conformation to the reinforcing fibers in the rod. Alternatively, the two ends of the plastic rod may be rotated a measured number of degrees or radians in opposing directions while tension is maintained on the heated area. The plastic rod is then given the desired degree of bend by bending the rod about a flat surfaced or grooved mandrel of suitable diameter while the plastic rod is kept under tension and in an at least partially fluid state, then held stationary while the rod solidifies or cures.

Alternatively the rod may be bent onto a flat surfaced or grooved mandrel having a dimension "out of plane" from the mandrel. For example, a cylindrical or conical coiled spring could be formed by means of multiple bends of twisted rod onto a cylindrical or conical mandrel.

Alternatively, reinforced plastic rods which have a thermoset rather than thermoplastic type matrix material can be used. This requires that the rods are only partially cured before the postforming twisting and bending, and are maintained in tension on the mandrel until cured sufficiently to hold their shape.

Having the reinforcing fibers in a continuous fiber reinforced plastic rod in a helical arrangement relative to the longitudinal axis of the rod facilitates any postforming of the rod which requires bends. Such postforming may be necessary for manufacture of coil springs, torsion springs, or miscellaneous shapes. When rods with continuous longitudinally aligned unidirectional fibers are bent, the fibers on the outside radius are tensioned about the outside radius arc length while the fibers on the inside radius undergo compression and buckle to form an inside radius of smaller arc length. The number of helices along a given length of the rod, diameter of the rod, the radius and the bend to be formed can be selected to minimize buckling caused by bending.

Figure 1:
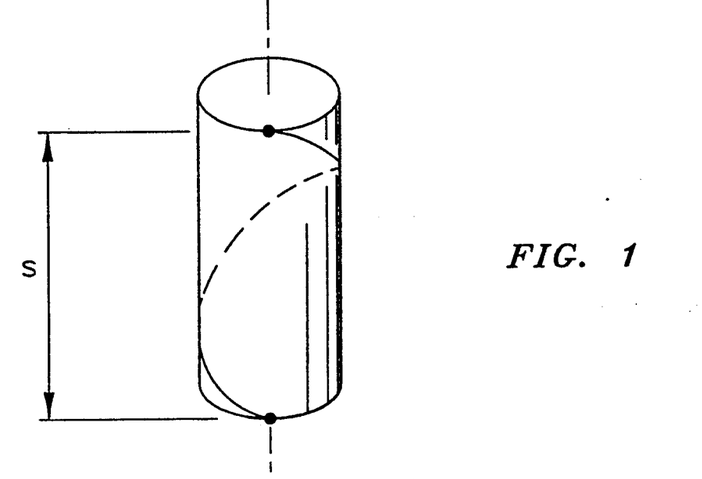
FIG. 1 illustrates a continuous reinforcing fiber helix length.

The problem of fiber buckling in the inside radius of a bend in continuous fiber reinforced rods is significantly reduced by this invention in which the fibers on the surface of the rod are made to travel substantially the same distance around a bend whether on an outside radius or an inside radius of the bend. In order to meet the criterion that all surface fibers travel substantially the same distance around a bend, the fiber must follow a helical path a minimum of $2\pi$ radians (360°) over the average arc length of the bend, or $2\pi x$ radians where $x$ is a non-zero integer. FIG. 1 illustrates a given surface fiber completing a $2\pi$ radian (360°) cylindrical helix over the average arc length, S, prior to bending the rod. The helix direction may be clockwise or counterclockwise for bends which lie in a single plane. The helix direction will not have an effect on formation of bends contained in a single plane; however, the helix direction will affect the torsional strength and stiffness of the rod once it has been bent. The helix direction does interact with out-of-plane bends such as those in coiled springs and thus has an effect on the ease with which bends can be made in the rod as well as affecting torsional strength and stiffness in the bent rod after manufacture.

The preferred correlation of the number of helices, with the desired arc length to be formed is:

$$\phi = \frac{x2\pi}{S} \qquad (I)$$

wherein
  $\phi$ = number of helices, expressed in radians, per unit length
  S = average arc length of bent rod
  x = a non-zero integer
A positive or negative value may be used for x to indicate that helical rotation is in a clockwise or counterclockwise direction.

Figure 2:
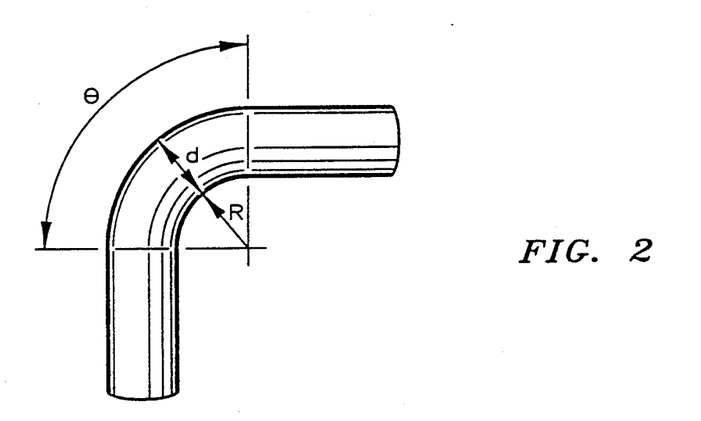
FIG. 2 illustrates a 90° ($\frac{1}{2}$ $\pi$ radian) bend in a continuous fiber reinforced rod.

Assuming the rod bends $\Theta$ radians about a radius R, with a rod diameter d, as shown in FIG. 2, then the average arc length, S, may be calculated:

$$S = (R + d/2)\Theta \qquad (II)$$

wherein
  R = inside radius of bend as shown in FIG. 2.
  d = diameter of reinforced rod as shown in FIG. 2.
  $\Theta$ = radians of bend about the radius R as shown in FIG. 2.
  (R + d/2) = average radius of the bend,
and wherein S, R, and d are all expressed in consistent units of length.

Therefore by substitution of formula II into formula I, the preferred number of helices per unit length of the rod becomes:

$$\phi = \frac{x2\pi}{(R + d/2)\Theta} \qquad (III)$$

wherein $\phi$ = number of helices, expressed in radians, per unit length
  R = inside radius of bend as shown in FIG. 2
  d = diameter of reinforced rod as shown in FIG. 2
  $\Theta$ = radians of bend about the radius R as shown in FIG. 2
  x = a non-zero integer For the preferred number of helices per unit length of the rod, as described in formula III, if x takes on its minimum absolute value of + or −1, the minimum number of cylindrical helical radians needed per unit length of the rod ($\phi_{min}$) is calculated thusly:

$$\phi_{min} = \frac{\pm 2\pi}{(R + d/2)\Theta} \qquad (IV)$$

wherein $\phi_{min}$ = minimum number of helical radians per unit length
  R = inside radius of bend as shown in FIG. 2
  d = diameter of reinforced rod as shown in FIG. 2
  $\Theta$ = radians of bend about the radius R as shown in FIG. 2

Formulation III insures a cylindrical helix with an integer multiple of $2\pi$ radians (360°) over the average arc length of the bend. In a rod with reinforcements in the configuration described by formula III, x is a non-zero integer. However, significantly improved postformed bends may be made when x is any real number outside the range of −1 to +1. It should be noted that postformed bends will be improved at least to some extent when x is any non-zero real number.

This assertion that all surface fibers travel substantially the same distance when formulation III is applied has been demonstrated, within roundoff error, by computer simulations of pertinent geometry. Computer simulations of rods bent $\pi/4$, $\pi/2$, $\pi$, and $2\pi$ radians showed that all surface fibers traveled the same distance, within computer roundoff error, when $\phi_{min}$ was applied. Conversely, the same simulations showed differences in distance of surface fiber travel of up to 47% for cases where $\phi$ was not equal to $x2\pi$ radians (where x was a non-zero integer). Larger differences can easily be found by additional computer simulations.

Once the number of cylindrical helical radians per unit length, $\phi$, have been determined, then the cylindrical helical radians to be made in a given length of rod is found by taking the product of $\phi$ and the given length, or ($\phi$) (given length), where the given length is expressed in length units consistent with the units of $\phi$. In a rod with the fibers arranged so as to have the optimum advantage of this invention, the "given length" is greater than or equal to S (see formula II) and $\phi$ is determined by formulation III. However, it is recognized that post formed bends will be improved, at least to some extent, using any non-zero value of "given length" and $\phi$.

Formulations III and IV relate $\phi$, R, d, and $\Theta$. Therefore given any three of the variables, the fourth may be calculated. In practice the desired values of R, d, and $\Theta$ will usually be known, with $\phi$ to be calculated. However each of the other variables can also be solved for as follows:

Given $\phi$, d, and $\Theta$, $$R = \frac{x 2\pi}{\phi \Theta} - d/2 \quad \text{(V)}$$

wherein R=inside radius of bend
$\phi$=number of helices, expressed in radians, per unit length
$\Theta$=radians of bend about radius R
d=diameter of rod
for optimum improvement, x=a non-zero integer
for significant improvement, x=a positive real number outside the range $-1$ to $+1$
for some improvement, x=any non-zero real number, and wherein R and d are expressed in consistent units of length.

Given $\phi$, R, and $\Theta$, $$d = \frac{x 4\pi}{\phi \Theta} - 2R \quad \text{(VI)}$$

wherein R=inside radius of bend
$\phi$=number of helices, expressed in radians, per unit length
$\Theta$=radians of bend about radius R
d=diameter of rod
for optimum improvement, x=a non-zero integer
for significant improvement, x=a positive real number outside the range $-1$ to $+1$
for some improvement, x=a non-zero real number
and wherein R and d are expressed in consistent units of length.

Given $\phi$, R, and d, $$\Theta = \frac{x 2\pi}{(R + d/2)\phi} \quad \text{(VII)}$$

wherein R=inside radius of bend
$\phi$=number of helices, expressed in radians, per unit length
$\Theta$=radians of bend about radius R
d=diameter of rod
for optimum improvement, x=a non-zero integer
for significant improvement, x=a positive real number outside the range $-1$ to $+1$
for some improvement, x=a non-zero real number
and wherein R and d are expressed in consistent units of length.

Figure 3:
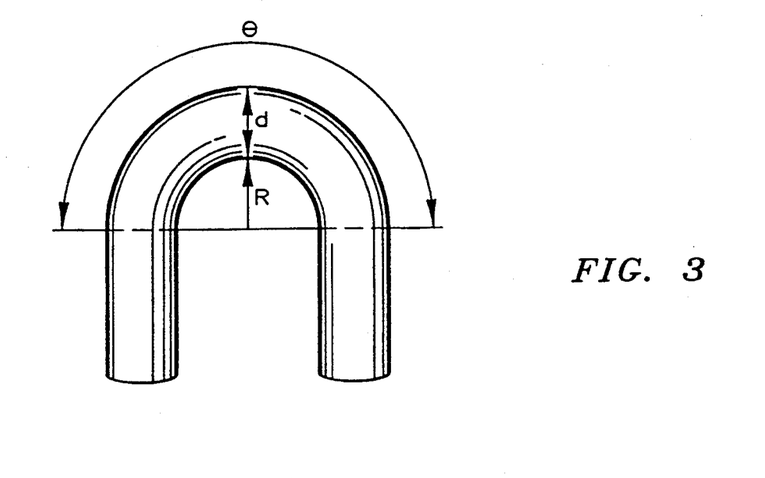
FIG. 3 illustrates a 180° ($\pi$ radian) bend in a continuous fiber reinforced rod.

In addition to conformance with the formulations expressed above, there are additional practical considerations governing the correlation of x (the number of cylindrical helices of reinforcing fibers along a given length of rod) with the radians of bend to be made in the rod. These include the limitation that the distance R should generally be equal to or greater than the distance d, as shown in FIGS. 2 and 3.

The helix lead pitch, P, is defined as the longitudinal length required for the helix to undergo a $2\pi$ radian rotation and is thus inversely proportional to $\phi$. There is a practical limitation as to how large the helix lead pitch can be. For example, P probably should not be much greater than about 3 inches for rods near $\frac{1}{4}$ inch in diameter, because this affects how far the fibers have to slip when the rod is bent.

A further practical limitation is that neither the rod diameter nor the number of helices per unit length can exceed a workable maximum to prevent too large a difference in length between the center and surface fibers of the rod, and to prevent excessive cross-sectional distortions.

The practical limitations set forth in these paragraphs may be experimentally determined for various values of R, d, $\phi$ and $\Theta$, using the formulations expressed above as guidelines in determining $R_{min}$, $d_{min}$, $\phi_{min}$ and $\Theta_{min}$.

The operability of correlation of x (the number of helices along a given length of a given diameter of rod) to the radians of bend to be postformed into the rod has been demonstrated by this example: $\frac{1}{4}$" diameter reinforced poly(phenylene sulfide) rods were bent $\pi$ radians (180°) about a 1" diameter mandrel. Using a 1" diameter mandrel gives a bend radius R of $\frac{1}{2}$". Thus the average radius of the bend equals (R+d/2) or $$\left(\frac{1}{2}" + \frac{.25"}{2}\right).$$

The 180° bend is $\pi$ radians of bend, so $\Theta = \pi$ radians. The minimum number of helices per unit length, $\phi_{min}$, then is $$\frac{2\pi \text{ radians}}{\left(\frac{1}{2}" + \frac{.25"}{2}\right)\pi \text{ radians}} = 3.2 \text{ radians/inch.}$$

The average arc length $S = (R+d/2)\Theta$ or, in this example, S=1.9635 inches.

One embodiment of this invention as described above and in reference to FIGS. 5, 6 and 7 involves accomplishing the above described arrangement of fibers within the plastic rod by twisting of a rod with unidirectionally aligned fibers after pultrusion.

Alternatively, plastic rod in which the fibers have been conformed to a helical pattern during pultrusion rather than by twisting of the rod subsequent to pultrusion can be used if the number of helices along a given length of the rod is controlled relative to the diameter of the rod, radians of bend, and radius of the bend or bends to be postformed in the rod. The helical arrangement of the fibers within the plastic rod can be accomplished by rotating the fiber rovings entering the rod die during pultrusion or by use of a rotating creel or creels of thin strips of prepreg tape prior to formation in a heated die.

Alternatively, the invention may be practiced using a fiber reinforced tube or fiber reinforced rod with a hollow core. Also, the invention may be practiced with non-cylindrical elongated structures using suitable apparatus and modifications together with appropriate changes in formulation III. These changes involve modifying the inside radius of the bend, R, to include appropriate shape factors.

Although helical arrangements of the reinforcing fibers were used in this embodiment of the invention, reinforcing fibers in a braided arrangement would be an equally useful adaptation of this invention if the interlocking nature of the braid doe snot restrict fiber movement too severely. This can be achieved by layering of concentric levels of braided reinforcement fiber to build up the rod to the desired diameter. The effective helical pattern of the interwoven fibers should be such that the number of effective helices along a given length of the rod is related to the radius of the postforming bends to be made in the reinforced rod and the diameter of the rod in the same manner as described herein for use of rods with reinforcing fibers in a helical pattern.

Figure 4:
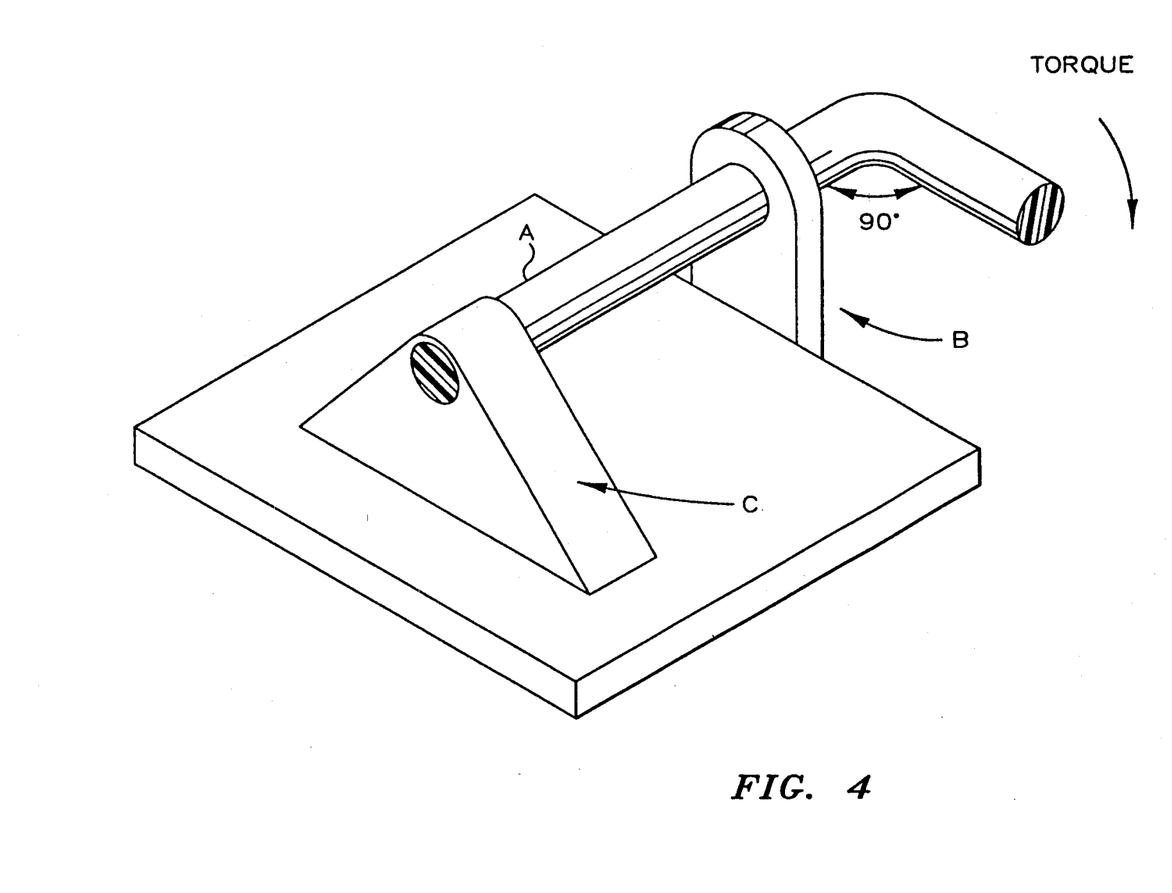
FIG. 4 illustrates one type of torsion spring made from continuous fiber reinforced rod material.

Referring no to FIG. 4, a torsion spring is made from a helically reinforced plastic rod which has the reinforcing fibers arranged according to the method explained above. Problems with manufacture of and buckling of reinforcing fibers in the bend of the reinforced plastic part have been avoided by use of the inventive method and article of manufacture described and claimed in this application. The reinforced plastic rod A is bent at a 90° angle ($\pi/2$ radians), supported near the bend by a bearing mount B which permits the rod to pivot, and is attached at the end on the opposite side of the pivot mount B from the 90° bend to a rigid mount C. Torque applied on the end of the rod opposite the end which is non-pivotally mounted is resisted by the spring action.

Figure 5:
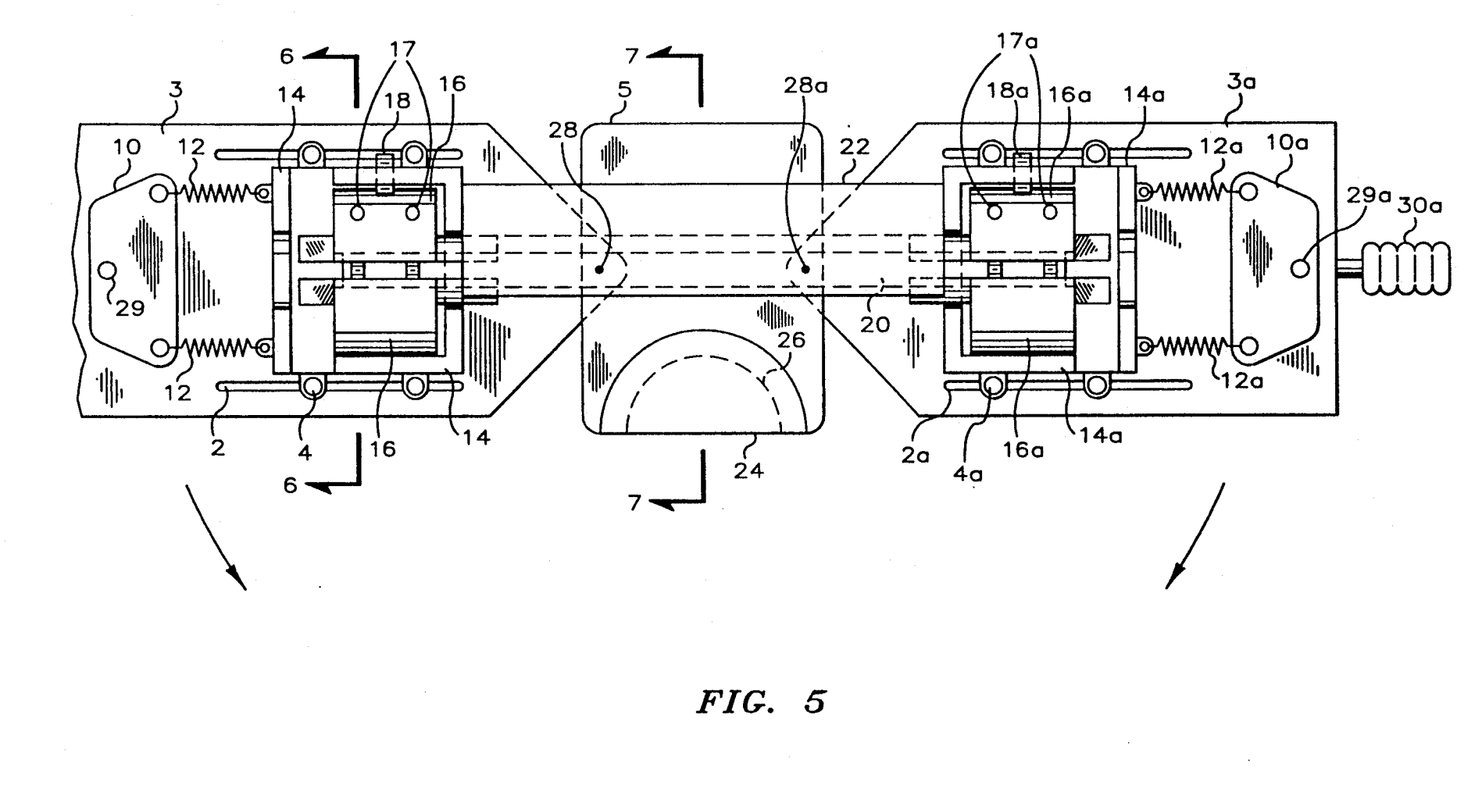
FIG. 5 illustrates an apparatus for orienting the fibers of a reinforced plastic rod in a helical configuration and bending the rod.
Figure 6:
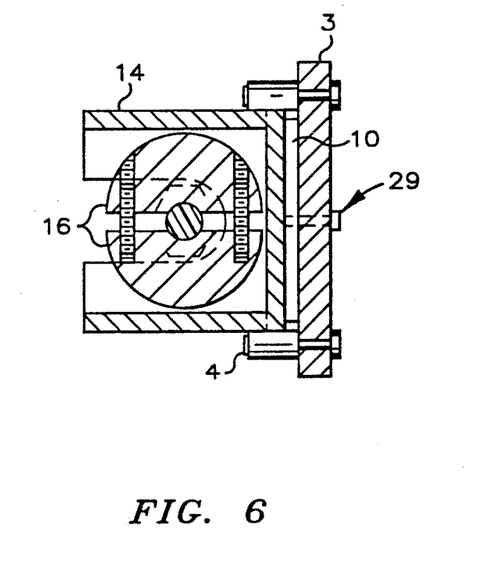
FIG. 6 illustrates a sectional view of the rod grip along the line 6—6.
Figure 7:
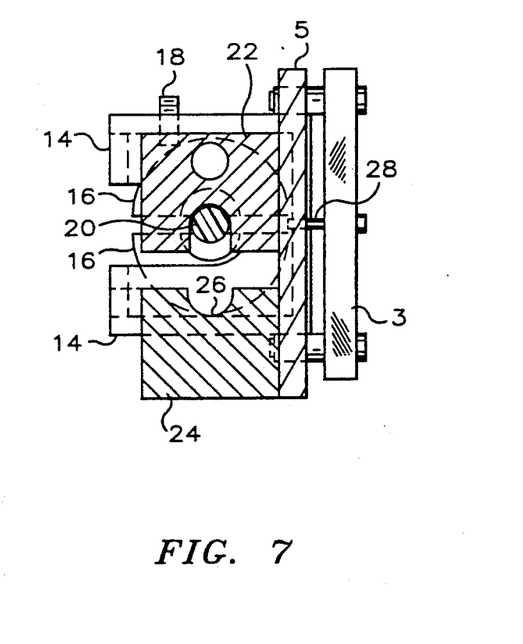
FIG. 7 illustrates a sectional view of the continuous fiber reinforced rod, heater block and grooved mandrel at the midpoint of the inventive apparatus as viewed from the section line 7—7 on FIG. 5.

Referring now to FIGS. 5, 6 and 7, an apparatus has been provided for heating, tensioning, and twisting a reinforced plastic rod which has continuous longitudinally aligned unidirectional reinforcing fibers about the longitudinal axis of the rod so as to cause the reinforcing fibers to conform to a helical arrangement with respect to the longitudinal axis of the rod. The apparatus in FIGS. 5, 6 and 7 also provides a means for heating and bending the reinforced rod about a grooved mandrel after the helical arrangement of the reinforcing fibers has been accomplished.

Referring to FIG. 5, the rod 20 to be twisted and bent is surrounded on three sides by a heater block 22. Each end of the rod is secured in tensioned rod grips 16 and 16a by means of the respective rod grip assembly screws 17 and 17a. Set screws 18 and 18a are then used to hold the ends in torqued position. The rod grip assemblies are tensioned by having brackets 14 and 14a, against which the rod grips 16 and 16a abut. Brackets 14 and 14a are attached to springs 12 and 12a which attach the rod grip assemblies under tension to plates 10 and 10a. Plates 10 and 10a are attached by means of pivot pins 29 and 29a to pivoting mounting plates 3 and 3a. Brackets 14 and 14a are mounted by means of pins 4 and 4a to the slotted holes in pivoting mounting plates 3 and 3a. Therefore brackets 14 and 14a are free to slide along the slotted holes 2 and 2a in pivoting mounting plates 3 and 3a. The pivoting mounting plates 3 and 3a swivel about pivot pins 28 and 28a so as to bend and translate the gripped rod 20 downward to contact a heated mandrel 24 with a groove 26 to serve as a shaping receptor for the rod 20 being bent. The pivot pins 28 and 28a pivotally mount the plates holding the rod grip assemblies 3 and 3a to a stationary mounting plate 5. The plates 3 and 3a holding the rod grip assemblies are equipped with handles 30 and 30a to facilitate use of the apparatus.

Alternatively, a mandrel without a groove may be employed. Also, under some conditions an unheated mandrel may be employed. Also, under some conditions, compaction forces may be applied as the rod is curing or solidifying. Compaction may be applied by matched tooling, vacuum bagging, or other suitable means.

FIG. 6 is a cross section along the plane 6—6 showing the rod grip assembly and mounting plates. The brackets 14 holding the rod grips 16 are attached by means of springs to plate 10 which is attached by means of pivot pin 29 to pivotal plate 3.

The cross section of the midpoint of the apparatus is shown in FIG. 7. The rod 20 is surrounded on three sides by the heating block 22. Once the rod is heated to its melting point, the rod grips 16 holding the end of the rod 20 can be rotated about the longitudinal axis of the rod as necessary and secured in the rotated position by means of a set screw 18 through the bracket 14 which holds the rod grips 16 by being in contact with the outer diameter of the rod grips 16. If the rod to be bent already has the desired helical arrangement, no rotation of the rod grips 16 is necessary. Once the desired helical arrangement of reinforcing fibers in the rod has been achieved, the ends of the rod 20 can then be bought downward by pivoting plate 3 around pivot pin 28 so as to bend the rod 20 the desired number of degrees about the mandrel 24. The mandrel 24, may be heated to facilitate bending. Design of the apparatus allows for rods of indefinite length to be mounted for bending because the untreated ends of the rod may extend beyond the ends of the apparatus. The rod is held stationary and under tension in this bent position until the rod cools or cures to the point at which it can hold its shape during removal from the apparatus. The groove 26 in the mandrel 24 serves as a guide for the rod during bending.

If a tube or hollow rod were being postformed in the inventive apparatus, then a removeable insert may be used in the tube or hollow rod during twisting and bending if desired.

Mandrels with grooves having different shapes can be used to impart different cross-sectional configurations to the heated portion of the rod bent about the mandrel. Also, the invention may be practiced by maintaining compaction forces on the elongated structure during the bending operation to better maintain consolidation and cross-sectional shape.

While the article of manufacture, the process and apparatus of this invention have been described in detail for the purpose of illustration, the inventive article, process and apparatus are not to be construed as limited thereby. This patent is intended to cover all changes and modifications within the spirit and scope thereof.

That which is claimed is:

1. A method for making fiber reinforced plastic rods to minimize tensioning and buckling of continuous reinforcing fibers when said rods are bent, said method comprising:
   (a) heating a rod having longitudinally arranged continuous reinforcing fibers; and
   (b) twisting said rod to rotate said continuous reinforcing fibers about the longitudinal axis of said rod, thereby conforming said continuous reinforcing fibers into helices according to the formula:

$$\phi = \frac{x 2\pi}{(R + d/2)\theta}$$

wherein $\phi$=number of helices, expressed in radians, per unit length

R=inside radius of a bend to be postformed in said rod d=diameter of said rod $\Theta$=radians of said bend to be postformed about said inside radius x=a non-zero real number and R and d are expressed in consistent units of length, whereby said bend postformed to said twisting is limited as to said inside radius of said bend and the radians of said bend about said inside radius.

2. A method for making fiber reinforced plastic rods to minimize tensioning and buckling of continuous reinforcing fibers when said rods are bent, said method comprising:

(a) heating a rod having longitudinally arranged continuous reinforcing fibers; and (b) twisting said rod to rotate said continuous reinforcing fibers about the longitudinal axis of said rod, thereby conforming said continuous reinforcing fibers into helices according to the formula:

$$\phi = \frac{x2\pi}{(R + d/2)\theta}$$

wherein $\phi$=number of helices, expressed in radians, per unit length

R=inside radius of a bend to be postformed in said rod d=diameter of said rod $\Theta$=radians of said bend to be postformed about said inside radius x=a non-zero integer and R and d are expressed in consistent units of length, whereby said bend postformed to said twisting is limited as to said inside radius of said bend and the radians of said bend about said inside radius.

3. A method for making fiber reinforced plastic rods to minimize tensioning and buckling of continuous reinforcing fibers when said rods are bent, said method comprising:

(a) heating a rod having longitudinally arranged continuous reinforcing fibers; and (b) twisting said rod to rotate said continuous reinforcing fibers about the longitudinal axis of said rod, thereby conforming said continuous reinforcing fibers into helices according to the formula:

$$\phi_{min} = \frac{2\pi}{(R + d/2)\theta}$$

wherein $\phi_{min}$=minimize number of helices, expressed in radians, per unit length needed to provide optimum improvement R=inside radius of a bend to be postformed in said rod d=diameter of said rod $\Theta$=radians of said bend to be postformed about said inside radius and R and d are expressed in consistent units of length, whereby said bend postformed to said twisting is limited as to said inside radius of said bend and the radians of said bend about said inside radius.

4. A method as recited in claim 1 further comprising:

(c) heating said rod where said bend is to be made; and (d) forming said bend in said rod, said bend having an inside radius of bend and radians of bend about said inside radius limited by the number of helices of continuous reinforcing fibers formed in step (b).

5. A method as recited in claim 2 further comprising:

(c) heating said rod where said bend is to be made; and (d) forming said bend in said rod, said bend having an inside radius of bend and radians of bend about said inside radius limited by the number of helices of continuous reinforcing fibers formed in step (b).

6. A method as recited in claim 3 further comprising:

(c) heating said rod where said bend is to be made;

(d) forming said bend in said rod, said bend having an inside radius of bend and radians of bend about said inside radius limited by the number of helices of continuous reinforcing fibers formed in step (b).

* * * * *

UNITED STATES PATENT AND TRADEMARK OFFICE
CERTIFICATE OF CORRECTION

PATENT NO. : 5,326,524

DATED : July 5, 1994

INVENTOR(S) : Vergil H. Rhodes, Jr., et al

It is certified that error appears in the above-indentified patent and that said Letters Patent is hereby corrected as shown below:

Title page, item [21], delete "489,152" after "Appl. No.:" and insert --498,152-- therefor.

Signed and Sealed this

Twenty-seventh Day of September, 1994

Attest:

BRUCE LEHMAN

Attesting Officer

Commissioner of Patents and Trademarks